(12) United States Patent
Carroll et al.

(10) Patent No.: US 6,606,905 B2
(45) Date of Patent: Aug. 19, 2003

(54) LIQUID LEVEL AND WEIGHT SENSOR

(75) Inventors: Carlton W. Carroll, Barboursville, VA (US); A. David Klein, Westlake, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 09/930,653

(22) Filed: Aug. 15, 2001

(65) Prior Publication Data

US 2003/0033871 A1 Feb. 20, 2003

(51) Int. Cl.$^7$ ............................................... G01F 23/00
(52) U.S. Cl. ........................ 73/299; 73/861.49; 73/301
(58) Field of Search ........................... 73/299, 301, 700, 73/290 R, 861.49

(56) References Cited

U.S. PATENT DOCUMENTS

| | | | |
|---|---|---|---|
| 2,068,135 A | * | 1/1937 | Howse ........................ 73/299 |
| 3,995,212 A | | 11/1976 | Ross |
| 4,332,166 A | * | 6/1982 | Lawford ....................... 73/299 |
| 4,485,673 A | * | 12/1984 | Stern ......................... 73/304 C |
| 4,489,601 A | | 12/1984 | Rao et al. |
| 4,598,381 A | * | 7/1986 | Cucci .......................... 364/558 |
| 4,722,228 A | * | 2/1988 | Awa et al. .................... 73/706 |
| 4,782,451 A | * | 11/1988 | Mazzarella et al. .......... 364/510 |
| 4,862,734 A | * | 9/1989 | Elderton ...................... 73/49.2 |
| 5,026,984 A | | 6/1991 | Gerdt |
| 5,185,709 A | * | 2/1993 | Johnson et al. .............. 364/558 |
| 5,604,315 A | * | 2/1997 | Briefer et al. ............ 73/861.49 |
| 5,811,690 A | * | 9/1998 | Hershey ................... 73/861.42 |
| 5,827,963 A | * | 10/1998 | Selegatto et al. .............. 73/438 |
| 5,870,695 A | * | 2/1999 | Brown et al. ................ 702/138 |
| 6,047,244 A | * | 4/2000 | Rud, Jr. ........................ 702/98 |
| 6,374,825 B1 | * | 4/2002 | Wallin et al. ........... 128/203.14 |

FOREIGN PATENT DOCUMENTS

JP        2000084084 A   *   3/2000   ................. 128/3.14

* cited by examiner

*Primary Examiner*—Helen Kwok
*Assistant Examiner*—Katina Wilson
(74) *Attorney, Agent, or Firm*—Seymour Levine; Gerald L. Lett; Jason M. Shapiro

(57) ABSTRACT

A liquid level and weight sensor utilizes a pressure sensor of any type positioned at the base of the liquid or weight. A second pressure sensor is positioned external to the liquid or weight to measure the ambient pressure. Ambient pressure is subtracted from the total pressure indicated by the base positioned pressure sensor to determine the actual pressure exerted by the liquid or weight on the base positioned sensor. The actual pressure is then utilized in the calculation of liquid level or weight.

The determination of liquid level requires that both the pressure and density of the liquid be known. When the density of the liquid is not known, a third pressure sensor is inserted in the tank at a known level above the first. The differential pressure and differential level are determinative of the liquid's density.

7 Claims, 5 Drawing Sheets

LIQUID LEVEL AND WEIGHT SENSOR

BACKGROUND OF THE INVENTION

1. Field of Invention

The invention pertains to the field of pressure sensing, and more particularly to determining the level of a liquid above a reference plane and the weight of an object with the use of pressure sensors.

2. Description of the Prior Art

Various sensor types have been employed in the prior art for sensing the level of a liquid in both stationary and mobile tanks. These prior art sensors have utilized mechanical, electromechanical, electromagnetic, electronic, and sonic systems to determine liquid levels. Problems exist in each of these systems. Mechanical systems using floats and levers are not sufficiently accurate for most applications. These systems have additional problems in large tanks where guide wires or large strip arrays must be used to cover large areas. In such systems the floats and levers can "hang up", further degrading the system accuracy.

Electronic liquid level measuring systems having electronic strip sensors are hazardous in highly combustible liquids in which a slight spark can cause a major conflagration. Measuring the level of caustic liquids presents a problem for both mechanical and electronic systems. The caustic liquid can "eat away" at the floats, levers, and electronic strips adversely affecting the system calibration, thereby further degrading the system accuracy.

Liquid level measuring devices using sonic or ultrasonic signals are complex when used to measure levels of contained liquids because of echos received from the walls of the container and layers of impurities in the liquid. These deficiencies are overcome by electromagnetic systems which utilize subnanosecond pulses and coaxial transmission lines, thus eliminating wall echos. One such system uses a slotted coaxial line. The slot, however, tends to clog and requires frequent cleaning. This problem is over come by eliminating the slot with the use of a single wire transmission line. Since these systems determine the level of the liquid by detecting reflections of electromagnetic waves from the liquid surface, they do not actually measure the liquid level above the floor of the tank.

An electromagnetic device that overcomes the deficiencies of the coaxial and single wire transmission systems uses a combination of single wire and coaxial transmission lines to detect reflections from the floor of the tank and the surface of the liquid. The difference between the arrival times of the two reflected signals is a measure of the liquid level above the floor of the tank. This system, however, is extremely complex and expensive.

All of the above deficiencies are overcome by the invention disclosed in U.S. Pat. No. 5,026,984 issued to David W. Gerdt on Jun. 25, 1991 and assigned to the assignee of the present invention. This invention uses a variable ratio pressure sensitive fiber optic coupler which is useful in a wide range of tanks and liquids. Gerdt's liquid level sensor, however, is extremely dependent on the characteristics of the specific sensor employed. Further, the invention disclosed by Gerdt does not account for pressure exerted on the surface of the liquid. Thus, it is not self calibrating and has an inherent error in the determination of the liquid level.

SUMMARY OF THE INVENTION

A liquid level and weight sensor in accordance with the present invention utilizes a pressure sensor of any type positioned at the base of the liquid or weight. A second pressure sensor is positioned external to the liquid or weight to measure the pressure exerted on the liquid or weight. This external pressure is subtracted from the total pressure indicated by the base positioned pressure sensor to determine the actual pressure exerted by the liquid or weight. The actual pressure is then utilized in the calculation of liquid level or weight.

The determination of liquid level requires that both the pressure and density of the liquid be known. When the density of the liquid is not known, a third pressure sensor is inserted in the tank at a known level above the first.

The differential pressure and differential level are determinative of the liquid's density.

DESCRIPTION OF THE PREFERRED EMBODIMENTS

Figure 1A:
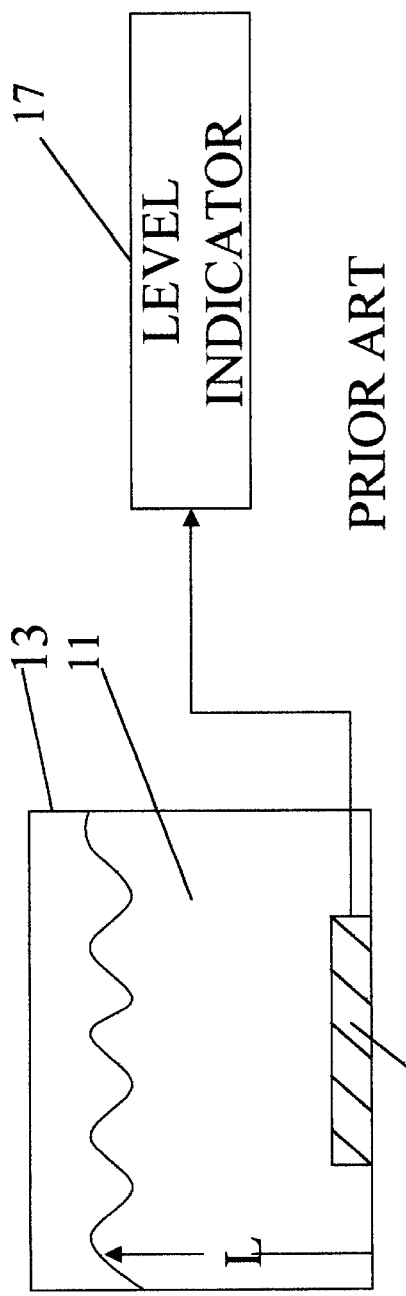
FIG. 1A is a diagram of a system for determining the level of a liquid with the use of a pressure sensor.

Refer now to FIG. 1A. The level of a liquid 11 in a tank 13 may be determined by sensing the pressure at the base of the tank with a pressure sensor 15. It is well known that the level L of the liquid may be determined from the formula $L=P/D$, where P is the pressure at the base of the tank and D is the density of the liquid. If the density is known, the level of the liquid may be provided by coupling the detected pressure level to a level indicator 17 which divides the pressure by the density of liquid stored therein.

Figure 1B:
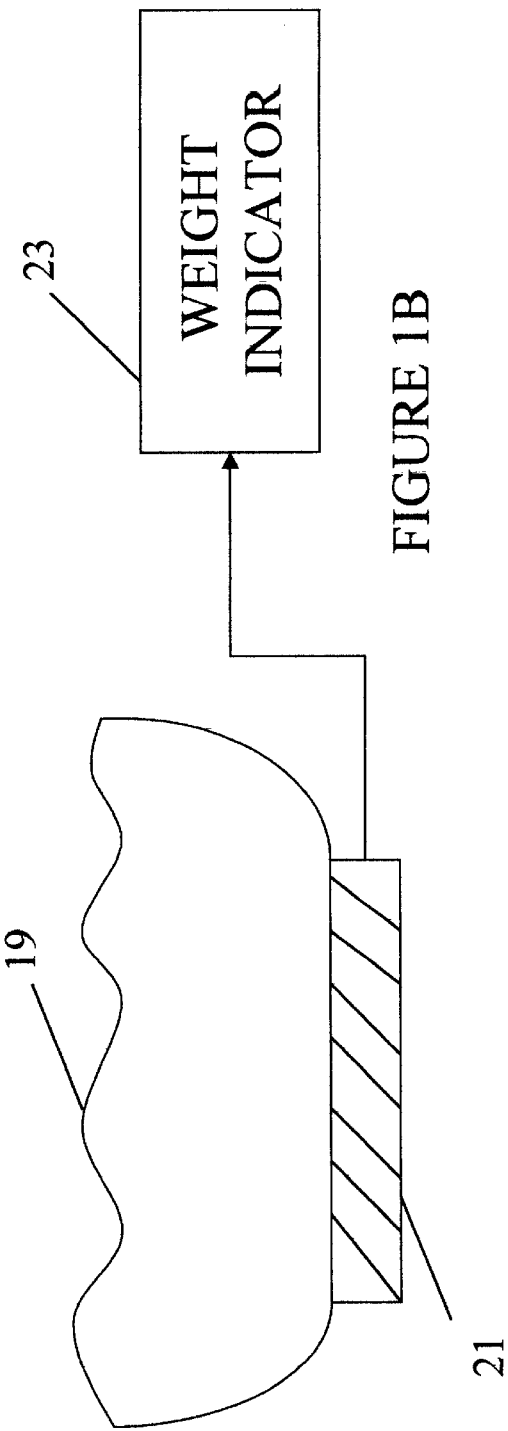
FIG. 1B is a diagram of a system for weighing an object with the use of a pressure sensor.

In a similar manner a weight measurement may be performed with a pressure sensor. An object 19 positioned on a pressure sensor 21, as shown in FIG. 1B, applies a pressure to the surface of the sensor that is equal to $W/A_S$, where W is the weight of the object and $A_S$ is the area of the surface. Since, the weight of the object is equal to the detected pressure times the area of the sensor surface ($W=PA_S$), the detected pressure is coupled to a weight indicator 23 wherein the multiplication is preformed and indicated.

Figure 2:
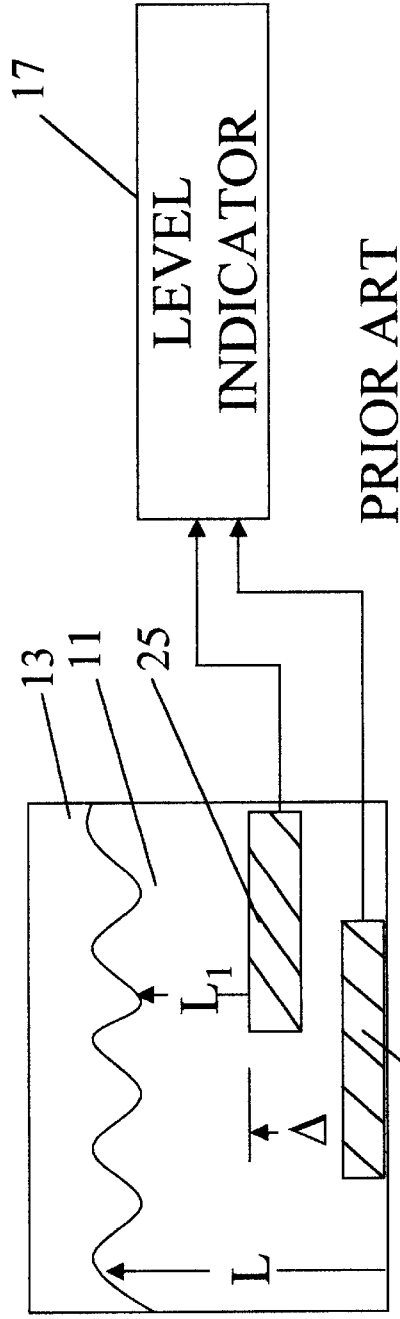
FIG. 2 is a diagram of a system for simultaneously determining the level of a liquid and its density with pressure sensors.

In situations for which the density of the liquid is not known, the system of FIG. 1A may be modified as shown in FIG. 2. In the figures, like reference numerals indicate like components. A second pressure sensor 25 may be located a distance Δ above the pressure sensor 15. Pressure sensor 25 will indicate a pressure $P_1$ commensurate with its location $L_1=L-\Delta$ below the surface of the liquid. A level indicator 17 receives the pressures P and $P_1$ sensed by the two pressure sensors and subtracts the pressure sensed by the second sensor 25 from the pressure sensed by the first sensor 15 and divides the difference by Δ, thus obtaining the density $[D=(P-P_1)/\Delta]$ of the liquid. Using this value for the density, the liquid level may be obtained from $[L=P\Delta/(P-P_1)]$. It should be recognized that the pressure external to the liquid is eliminated in the determination of density by the subtraction process but, since the second pressure measurement, like the first pressure measurement, is made below the liquid surface, it remains a factor in the determination of the liquid level.

Figure 3A:
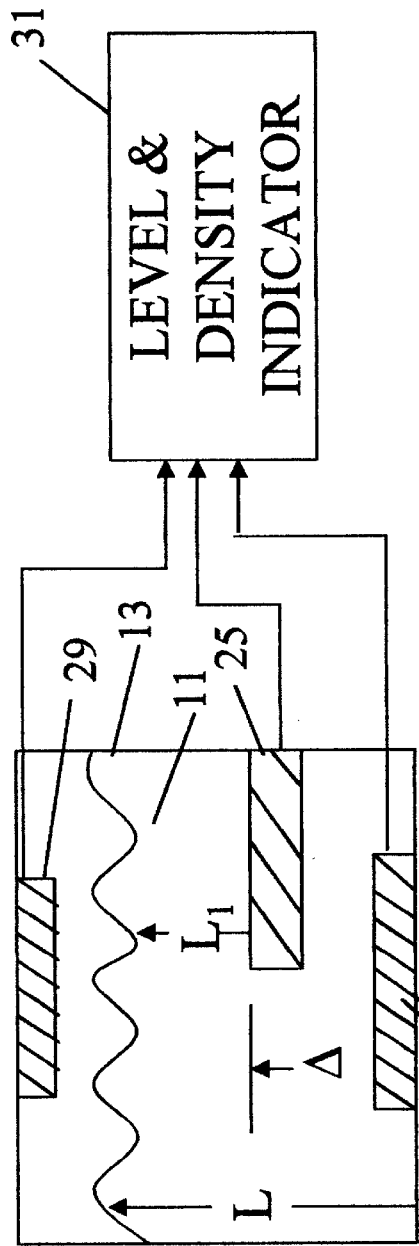
FIG. 3A is a diagram of a self calibrating liquid level sensor and density calculator utilizing pressure sensors.

A true liquid level may be obtained by providing a third pressure sensor 29 positioned to always be above the liquid surface, as shown in FIG. 3A. An initial calibration of the system is made by subtracting the pressure sensed by pressure sensor 29 from that sensed by pressure sensors 15 and 25 when the tank is void of liquid. Since these pressures are equal, a zero pressure reference is established. When liquid is in the tank its level is determined by subtracting the pressure $P_2$ sensed by pressure sensor 29 from the pressure P sensed by pressure sensor 15, thus providing the pressure $P_L=(P-P_2)$ exerted on the sensor by the liquid alone. Dividing $P_L$ by the density D, which, as shown above, is equal to $(P-P_1)/\Delta$, provides the true liquid level. These operations are performed in a density and true level indicator 31, a computer functional diagram of which is shown in FIG. 3B, to obtain the liquid level L and density D of the liquid in the tank where L equals $(P-P_2)\Delta/(P-P_1)$.

Figure 3B:
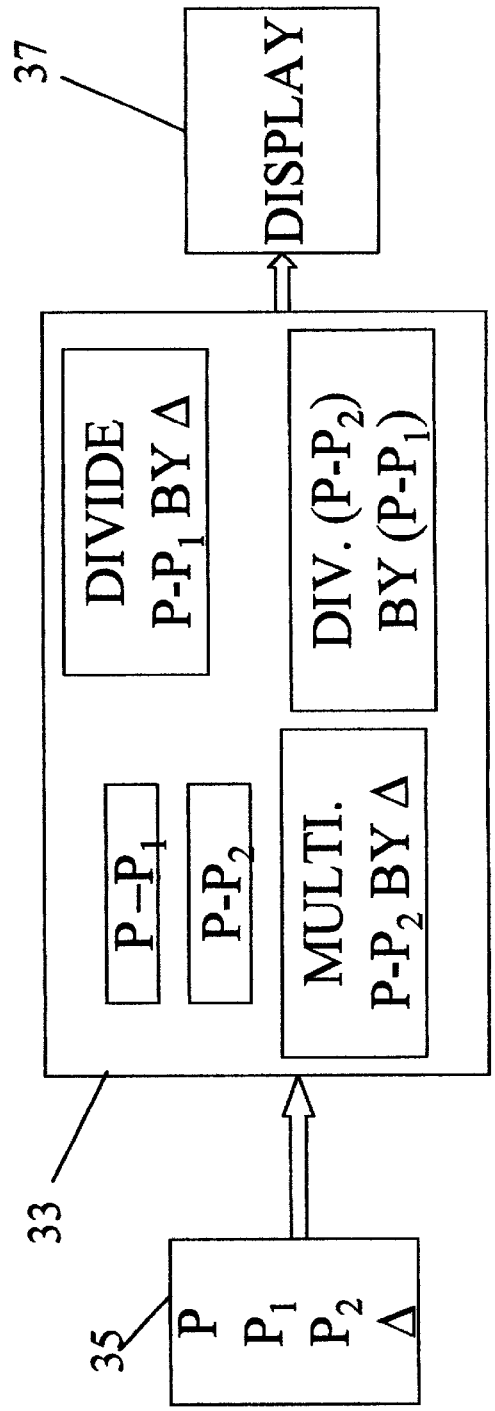
FIG. 3B is a computer function diagram for calculating liquid level and density from pressure values provided by the pressure sensors of FIG. 3A.

Refer now to FIG. 3B, wherein a block diagram of the true density and level indicator 31 is shown. A computer 33 receives P, $P_1$, $P_2$, and Δ from an input device 35 and performs the operations $(P-P_1)$, $(P-P_2)$, $(P-P_1)/\Delta$, $(P-P_2)\Delta$, and $(P-P_2)\Delta/(P-P_1)$ shown in computer 33 to determine the liquid level L and density D, and couples these values to a display 37.

After the initial calibration the system is self calibrating. Variations in external pressure, which may affect the accuracy of the liquid level and density measurements, are eliminated in the system processing described above wherein the external measured pressure is subtracted from the two measured liquid pressures. Thus, values of liquid level and liquid density are obtained that are independent of variations in external pressure, thereby establishing accurate liquid level and liquid density values.

Figure 4A:
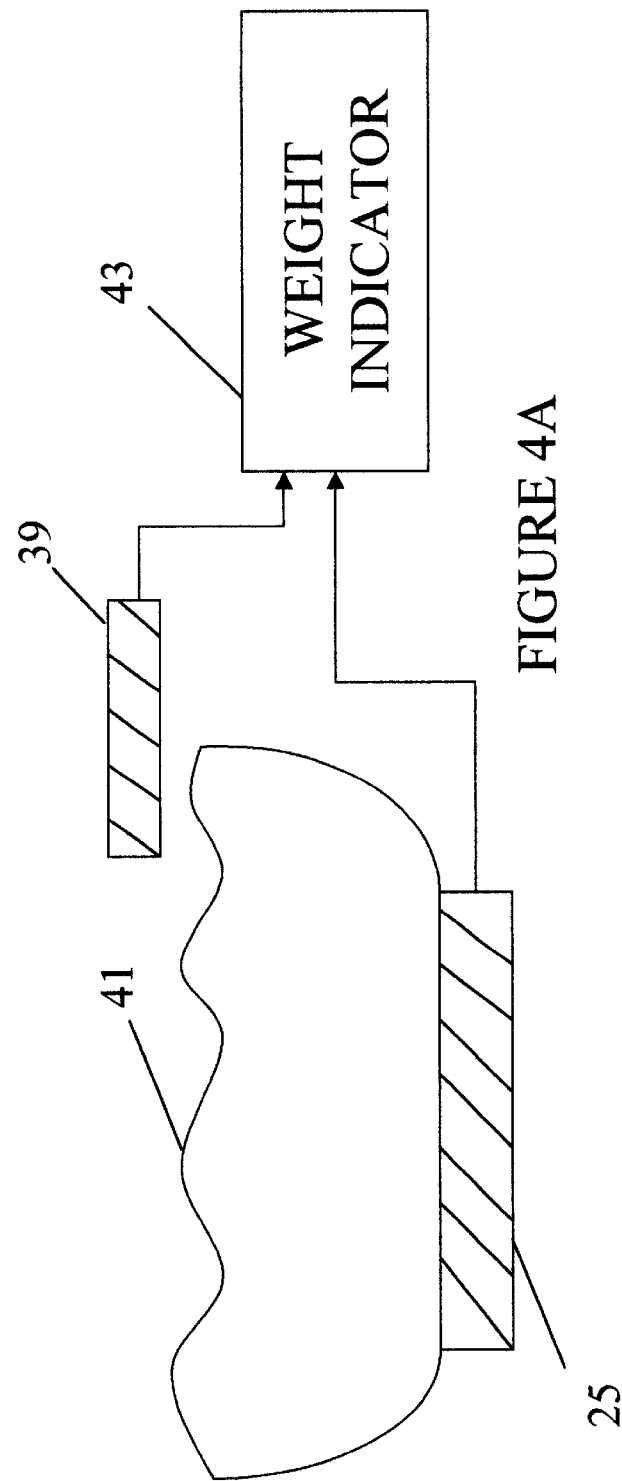
FIG. 4A is a diagram of a self calibrating system for determining the weight of an object with pressure sensors.

Refer now to FIG. 4A, wherein an external pressure compensated weighing system is shown. Pressure external to an object 41 is obtained by a pressure sensor 39. External pressure determined by sensor 39 is then coupled to a true weight indicator 43 to which the pressure on sensor 25 due to the weight of the object 41 to be weighed is also coupled. The weight indicator 43 subtracts the external pressure $P_E$ from the pressure $P_W$ obtained by the pressure sensor 25 and multiplies the difference by the surface area $A_S$ of the sensor 25 to obtain the true weight of the object.

Figure 4B:
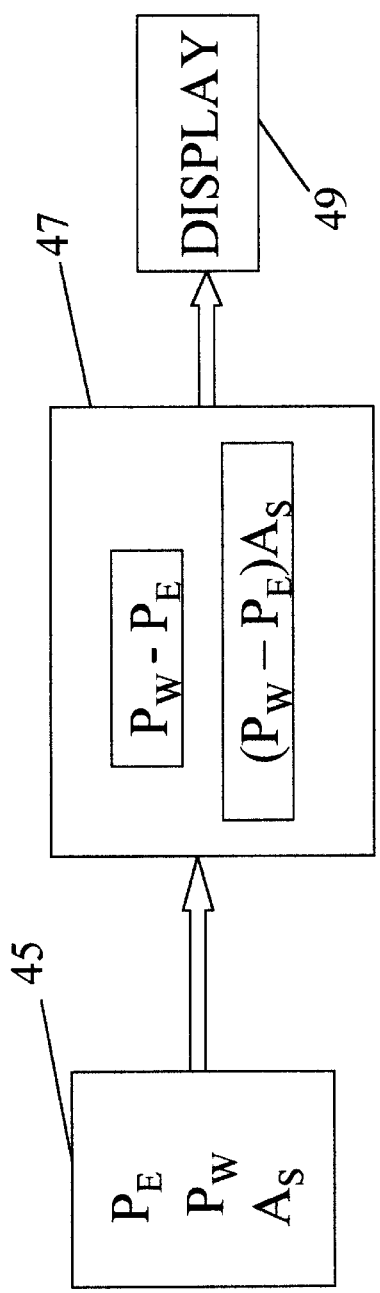
FIG. 4B is a computer function diagram for calculating the weight of an object from the pressure values provided by the pressure sensors of FIG. 4A.

A block diagram of a true weight indicator is shown in FIG. 4B. The true weight indicator 43 may comprise an interface device 45 that couples the values of $P_E$ and $P_W$ to a calculator 47, which may be a computer, wherein the weight is determined and shown by a display 49 coupled to the calculator 45.

Figure 5:
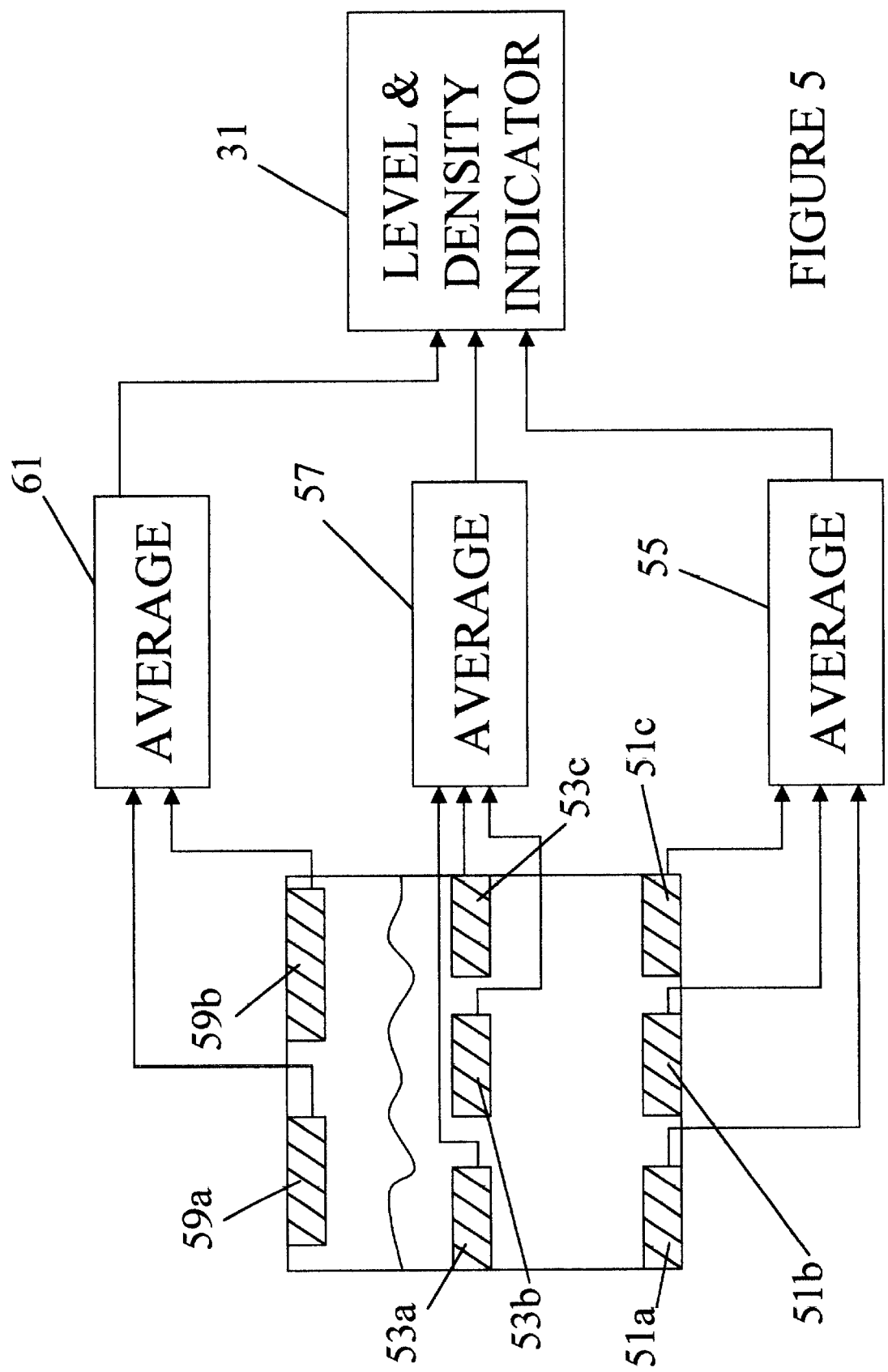
FIG. 5 is a diagram of a self calibration liquid level sensor system utilizing a plurality of base pressure sensors, reference pressure sensors, and external pressure sensors.

Liquid pressure at the base of a tank may vary due to its orientation or movement. A tank may be positioned with a tilt or may be on a moving vehicle, such as a ship or aircraft, so that wave actions by the liquid are produced due to the movement of the tank caused by the vehicle's dynamic conditions, thus establishing height and concomitant pressure variations. Compensation for these variations may be provided with the utilization of multiple sensors for each pressure measurement, as shown in FIG. 5. Values of the pressures sensed by a plurality of base pressure sensors 51a–51c are coupled from the sensors to an averaging device 55 wherefrom a pressure value that is the average of the three sensed pressures is coupled to the level and density indicator 31. Similarly, averages of a plurality of second pressures sensors 53a–53c are coupled from an averaging device 57 to the indicator 31 and the average pressure of a plurality of external pressure sensors 59a–59b is coupled from an averaging device 61 to the indicator 31. Level and density are computed by the level and density indicator 31 using the averaged pressures as previously described. It should be understood that the plurality of sensors at each level may vary from that shown in the figure and that any suitable number may be employed at each level.

Figure 6:
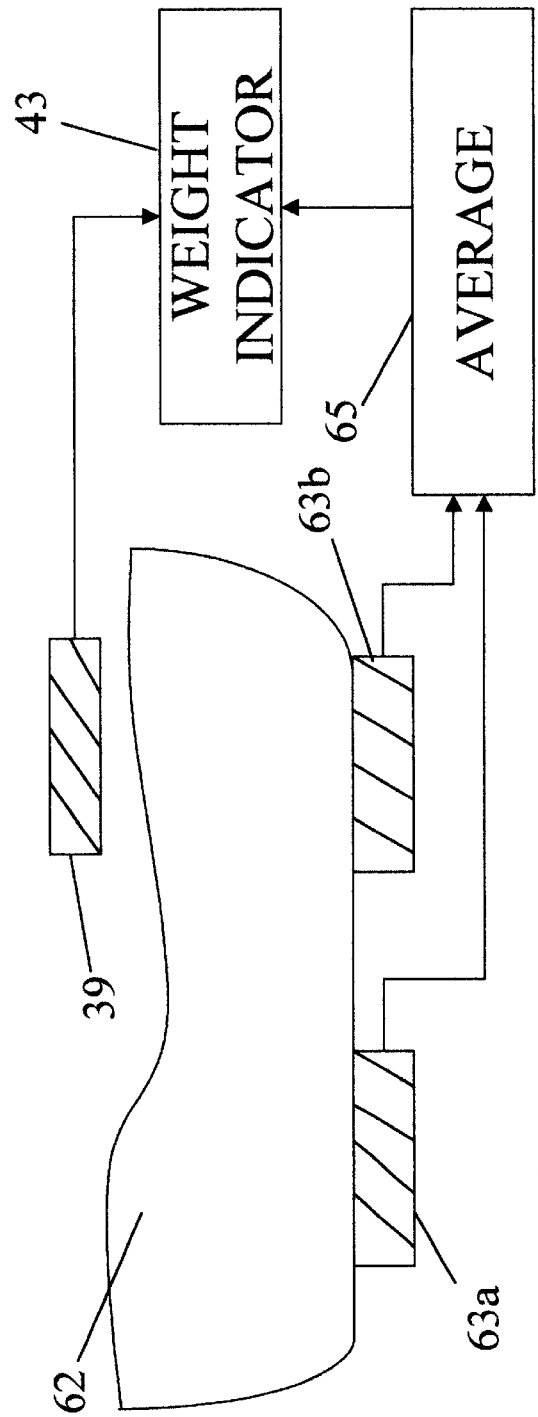
FIG. 6 is a diagram of a self calibrating system for determining the weight of an object utilizing a plurality of base pressure sensors.

Should the weight of an object have a center of gravity that is outside the surface of the pressure sensor it will tilt and the pressure sensor will provide an erroneous pressure measurement. This problem can be eliminated with a plurality of appropriately positioned pressure sensors, as shown in FIG. 6. An object 62 may be positioned on two pressure sensors 63a and 63b, though any number may be used. The values of the pressures sensed are coupled to an averaging device 65 from which the average of the pressures is coupled to the weight indicator 43 and processed as previously describe with the pressure sensed by the external pressure sensor 39, which may also be a plurality of pressure sensors, to obtain the weight of the object 62.

While the invention has been described in its preferred embodiments, it is to be understood that the words that have been used are words of description rather than limitation and that changes may be made within the purview of the appended claims without departing from the true scope and spirit of the invention in its broader aspects.

We claim:

1. An apparatus for sensing a level of a liquid, the liquid having a density, a liquid base, and a liquid surface, the level being the height of the liquid surface above the liquid base, comprising:

at least one base pressure sensor positioned at said base, whereby pressure at said base due to said height of said liquid is determined;

at least one external pressure sensor positioned above said liquid surface, whereby pressure external to said liquid surface is determined;

a level indicator coupled to said base pressure sensor and said external pressure sensor wherein said level of said liquid is determined from pressure values provided by said at least one base pressure sensor and said at least one external pressure sensor; and at least one intermediate sensor coupled to said level indicator and positioned below said surface at a predetermined height above said at least one base sensor, said level indicator utilizing pressure values provided by said at least one base pressure sensor and said at least one intermediate pressure sensor to determine said density of said liquid.

2. An apparatus in accordance with claim 1 wherein a pressure value $P_E$, determined by said at least one external pressure sensor is subtracted in said level indicator from a pressure value P, determined by said at least one base pressure sensor, to obtain a pressure difference $P-P_E$, said pressure difference divided in said level indicator by said liquid density to establish said liquid level.

3. An apparatus in accordance with claim 2 wherein a pressure value $P_I$, determined by said at least one intermediate pressure sensor, is subtracted in said level indicator from said pressure value P to obtain a second pressure difference $P-P_I$, and said pressure difference is divided by said predetermined height to establish said liquid density.

4. A method for sensing a level of a liquid, the liquid having a density, a liquid base, and a liquid surface, the level being the height of the liquid surface above the liquid base, comprising the steps of:

positioning at least one base pressure sensor at said base, whereby pressure at said base due said height of said liquid is determined;

locating at least one external pressure sensor above said liquid surface, whereby pressure external to said liquid surface is determined;

coupling said base pressure sensor and said external pressure sensor to a level indicator wherein said level of said liquid is determined from pressure values provided by said at least one base pressure sensor and said at least one external pressure sensor;

positioning at least one intermediate pressure sensor below said surface at a predetermined height above said at least one base sensor;

coupling said at least one intermediate pressure sensor to said level indicator; and determining liquid density from pressure values provided by said at least one base pressure sensor and said at least one intermediate pressure sensor.

5. A method in accordance with claim 4 further including the steps of:

determining a pressure value $P_E$ at said at least one external pressure sensor;

subtracting said pressure value $P_E$ from said pressure value P to obtain a pressure difference $P-P_E$;

dividing said pressure difference $P-P_E$ by said predetermined height to establish said liquid density.

6. A method in accordance with claim 5 further including the steps of:

determining a pressure value $P_I$ at said at least one intermediate pressure sensor;

subtracting said pressure value $P_I$ from said pressure value P to obtain a second pressure difference $P-P_I$; and dividing said second pressure difference $P-P_I$ by said predetermined height to establish said liquid density.

7. A method in accordance with claim 6 further including the step of subtracting a pressure value provided by said at least one external pressure sensor from a pressure value provided by said at least one base pressure sensor when no liquid is present, thereby providing a calibration for subsequent liquid level and density determinations.

* * * * *